United States Patent
Takahashi

(10) Patent No.: US 8,614,749 B2
(45) Date of Patent: *Dec. 24, 2013

(54) IMAGE PROCESSING APPARATUS AND IMAGE PROCESSING METHOD AND IMAGE CAPTURING APPARATUS

(75) Inventor: Kenji Takahashi, Urayasu (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/339,645

(22) Filed: Dec. 29, 2011

(65) Prior Publication Data

US 2012/0098993 A1    Apr. 26, 2012

Related U.S. Application Data

(63) Continuation of application No. 12/348,677, filed on Jan. 5, 2009, now Pat. No. 8,106,958.

(30) Foreign Application Priority Data

Jan. 17, 2008 (JP) .................................. 2008-008167

(51) Int. Cl.
*H04N 5/228* (2006.01)
*G06K 9/00* (2006.01)

(52) U.S. Cl.
USPC .......................... 348/222.1; 382/117; 382/167

(58) Field of Classification Search
USPC ...................... 348/221.1, 222.1; 382/167, 117
See application file for complete search history.

(56) References Cited

U.S. PATENT DOCUMENTS

| 7,155,058 | B2* | 12/2006 | Gaubatz et al. | 382/167 |
| 2003/0068084 | A1* | 4/2003 | Kinjo et al. | 382/164 |
| 2004/0213476 | A1* | 10/2004 | Luo et al. | 382/254 |
| 2005/0220347 | A1* | 10/2005 | Enomoto et al. | 382/190 |
| 2005/0232481 | A1* | 10/2005 | Wu | 382/167 |
| 2006/0280363 | A1* | 12/2006 | Umeda | 382/167 |
| 2007/0247662 | A1* | 10/2007 | Kasai et al. | 358/1.16 |

FOREIGN PATENT DOCUMENTS

| JP | 2004-350130 A | 12/2004 |
| JP | 2006-345513 A | 12/2006 |
| JP | 2006-350558 A | 12/2006 |

OTHER PUBLICATIONS

The above references were cited in a Feb. 13, 2012 Japanese Office Action, which is enclosed without an English Translation, that issued in Japanese Patent Application No. 2008-008167.

* cited by examiner

*Primary Examiner* — Roberto Velez
*Assistant Examiner* — Tuan Le
(74) *Attorney, Agent, or Firm* — Cowan, Liebowitz & Latman, P.C.

(57) ABSTRACT

An evaluation value for a pixel in an eye region in an image is computed, which is increased with increase in the redness of the pixel and with decrease in the luminance of the pixel. Furthermore, a color saturation value for the pixel included in the eye region is corrected with the use of a luminance value for a surrounding region around an eye and the evaluation value. In this case, the color saturation value is corrected such that the amount of correction is smaller in a case in which the luminance value is smaller even with the same evaluation value, thereby achieving improvement in the correction factor of and prevention of false corrections of a redeye region with a low color saturation and a low luminance.

7 Claims, 13 Drawing Sheets

EYE SURROUNDING REGION LUMINANCE CALCULATION REGION

IMAGE PROCESSING APPARATUS AND IMAGE PROCESSING METHOD AND IMAGE CAPTURING APPARATUS

CROSS-REFERENCE TO RELATED APPLICATION

This application is a continuation of application Ser. No. 12/348,677, filed Jan. 5, 2009, the entire disclosure of which is hereby incorporated by reference.

BACKGROUND OF THE INVENTION

1. Field of the Invention

The present invention relates to an image processing apparatus and an image processing method, and more particularly relates to an image processing apparatus and an image processing method for correcting a redeye region included in an image captured by an image capturing apparatus.

The present invention further relates to an image capturing apparatus that has the function of correcting a redeye region in a captured image.

2. Description of the Related Art

Conventionally, digital cameras have been known which capture optical images of subjects with the use of a photoelectric transducer and record the captured images as digital data on a recording medium typified by a memory card.

Furthermore, in a case in which a person is shot by flash photography (shot using a flash), a redeye effect is also known in which the person's eyes are photographed as red eyes. The redeye effect is caused by sensed blood vessels of retina, and likely to be caused particular in a case in which flash photography is carried out with pupils dilated in a dark place or the like.

In order to reduce the incidence of such redeye effect, image capturing apparatuses are known which have a redeye reduction function of using a lamp, a flash, or the like once immediately before flash photography (pre-emission) to constrict pupils and then carrying out flash photography. However, in a case in which a subject fails to gaze at a camera during pre-emission, the image capturing apparatuses have a problem in that the redeye reduction function is minimally effective.

While the redeye effect is caused in a similar way no matter which camera is used, a digital camera or a film camera, image processing can be easily applied to captured images in the case of a digital camera. Therefore, redeye correction techniques have been proposed in which a redeye region is automatically or semi-automatically modified in a case in which it is determined that redeye effect is caused in a detected face or detected eyes of a person included in the captured images. Japanese Patent Laid-Open No. 10-0233929 discloses detecting, as a face region, a region considered to have a flash color in a captured image and detecting a redeye region in the detected face region. Furthermore, Japanese Patent Laid-Open No. 2001-309225 discloses, for a camera which has a redeye correction function, using an algorithm for comparison between a detected geometric face model and face probability in combination with pattern matching to detect a face region in a captured image.

In the conventional art described above, a region as a candidate for a redeye region (a candidate redeye region) is detected with the degree of redness of a pixel as an evaluation value, and further, a final redeye region is specified from the size, shape, and the like of the candidate redeye region to correct the pixels in the redeye region. Therefore, computing the degree of redness of the pixels accurately is a critical factor which determines proper correction of red eyes (in other words, prevention of false corrections of regions other than the redeye region).

For example, pupil portions in which redeye effect is caused often have dark colors such as black or brown. Therefore, particular in a case in which only a small amount of flash light enters pupils, the color saturation and luminance of a redeye region will be decreased.

In order to detect such a redeye region, for example, it is conceivable to use an evaluation value E computed by the use of the following formula (1).

$$E=(2*R-G-B)/(2Y) \quad (1)$$

In the formula, R, G, and B respectively represent the values for red, green, and blue components of a pixel, and Y represents a luminance value.

This evaluation value E is obtained by normalizing the average value $((R-G)+(R-B))/2$ of color-difference signals R-G and R-B with the use of a luminance signal Y. Since this evaluation value E increases as the luminance value decreases, it is believed that the evaluation value E is effective for detection of redeye regions with their color saturation and luminance low.

However, in a case in which such an evaluation value E is used, the evaluation value for a region other than a redeye region, for example, a flesh region, is large in generally dark images such as underexposed images or images shot with no flash light reaching a subject. Therefore, such a case has a problem that a redeye region is likely to be falsely recognized, resulting in increase in the incidence of false correction.

The present invention has been made in consideration of these problems of the conventional art, and has as its object to achieve improvement in the correction factor of and prevention of false corrections of a redeye region with low color saturation and low luminance.

SUMMARY OF THE INVENTION

According to an aspect of the present invention, there is provided an image processing apparatus comprising: detection unit that detects an eye in an image and detects a partial region including the detected eye as an eye region; evaluation value computation unit that computes an evaluation value for pixels included in the eye region, the evaluation value increased with increase in the redness of a pixel and with decrease in the luminance of a pixel; luminance computation unit that computes a luminance value for a surrounding region around the eye in the image; and correction unit that corrects a color saturation value for pixels included in the eye region with the use of the evaluation value and the luminance value, wherein the correction unit corrects the color saturation value for the pixels included in the eye region such that, in a case in which the luminance value is smaller than the predetermined value even with the same evaluation value, the amount of correction is smaller than that in the case of the luminance value equal to or more than a predetermined value.

According to another aspect of the present invention, there is provided an image capturing apparatus comprising the image processing apparatus according to the present invention, wherein the image processing apparatus applies image processing to a captured image.

According to a further aspect of the present invention, there is provided an image processing method comprising: a detection step of detecting an eye in an image and detecting a partial region including the detected eye as an eye region; an evaluation value computation step of computing an evaluation value for pixels included in the eye region, the evaluation value increased with increase in the redness of a pixel and with decrease in the luminance of a pixel; a luminance computation step of computing a luminance value for a surrounding region around the eye in the image; and a correction step of correcting a color saturation value for pixels included in the eye region with the use of the evaluation value and the luminance value, wherein the correction step corrects the color saturation value for the pixel included in the eye region such that, in a case in which the luminance value is smaller than the predetermined value even with the same evaluation value, the amount of correction is smaller than that in the case of the luminance value equal to or more than a predetermined value.

According to another aspect of the present invention, there is provided a computer-readable storage medium with a program recorded thereon for making a computer function as each unit of the image processing apparatus according to the present invention.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Configuration of Image Capturing Apparatus

Figure 1:
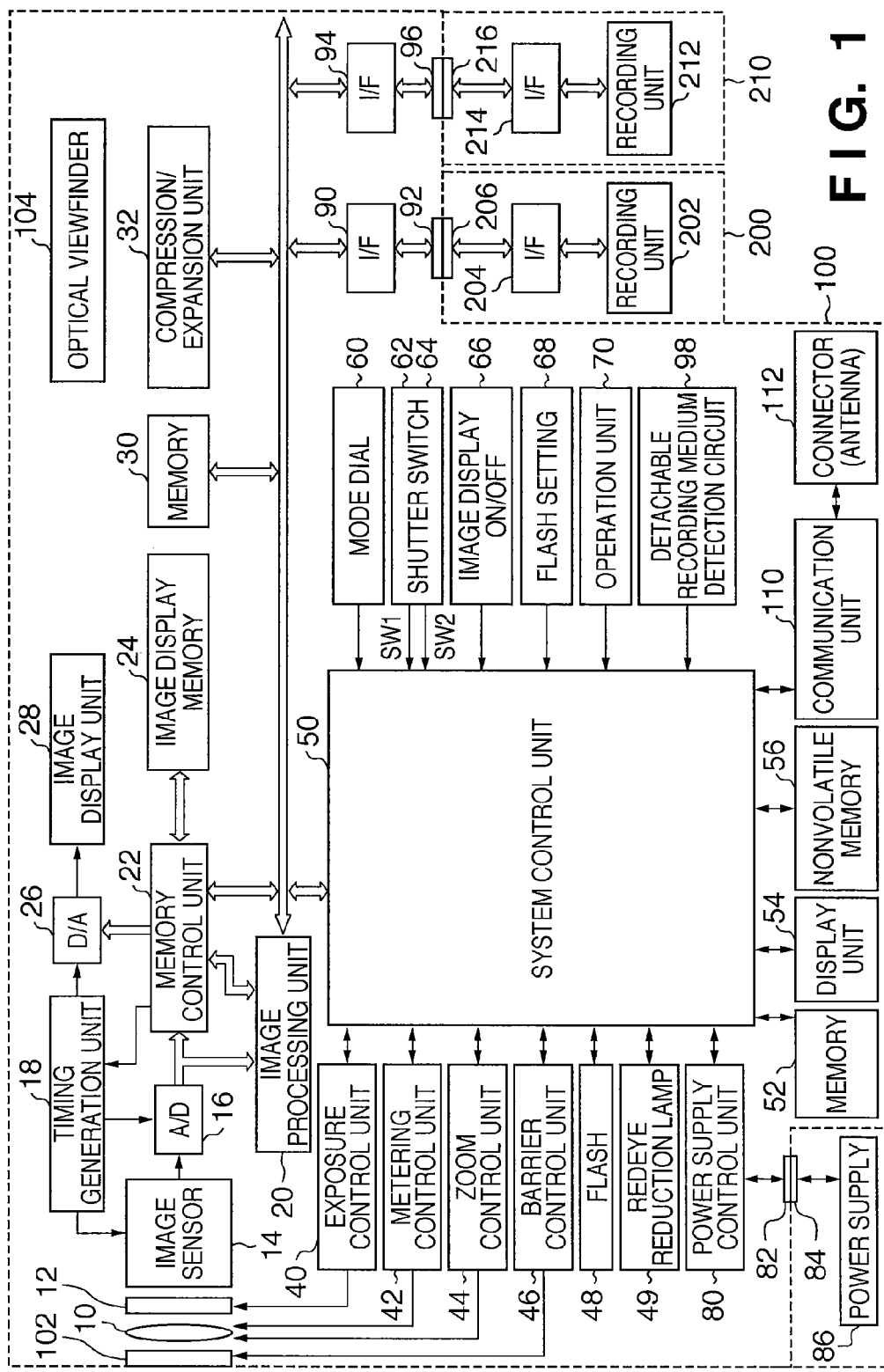
FIG. 1 is a diagram illustrating a configuration example of an image capturing apparatus as an example of an image processing apparatus according to a first embodiment of the present invention.

FIG. 1 is a diagram illustrating a configuration example of an image capturing apparatus 100 as an example of an image processing apparatus according to an embodiment of the present invention.

Reference numeral 10 denotes a lens, reference numeral 12 a shutter which has an aperture function, reference numeral 14 denotes an image sensor, such as a CCD or a CMOS sensor, for converting optical images into electrical signals, and reference numeral 16 denotes an A/D converter for converting analog signal outputs from the image sensor 14 into digital signals.

A timing generation unit 18 supplies clock signals and control signals to the image sensor 14, the A/D converter 16, and a D/A converter 26, and is controlled by a memory control unit 22 and a system control unit 50.

An image processing unit 20 applies predetermined pixel interpolation and color conversion processing to data from the A/D converter 16 or data from the memory control unit 22.

Furthermore, in the image processing unit 20, captured image data is used to carry out predetermined computation processing. Then, based on the obtained result of the computation processing, a system control unit 50 controls an exposure control unit 40 and a metering control unit 42 to achieve TTL (Trough The Lens) type AF (autofocus), AE (automatic exposure), and EF (flash pre-emission) functions.

Moreover, in the image processing unit 20, captured image data is used to carry out predetermined computation processing, and based on the obtained result of the computation processing, TTL-type AWB (Auto White Balance) processing is also carried out.

The memory control unit 22 controls the A/D converter 16, the timing generation unit 18, the image processing unit 20, an image display memory 24, the D/A converter 26, a memory 30, and a compression/expansion unit 32.

Output data from the A/D converter 16 is written into the image display memory 24 or the memory 30, via the image processing unit 20 and the memory control unit 22 or directly via the memory control unit 22.

The image data to be displayed, written into the image display memory 24, is displayed on an image display unit 28 such as an LCD or an organic EL display, via the D/A converter 26. When captured image data is sequentially displayed on the image display unit 28, an electronic viewfinder function can be achieved.

Furthermore, the image display unit 28 can optionally turn the display ON/OFF in response to a request from the system control unit 50, and the power consumption of the image capturing apparatus 100 can be reduced in a case in which the display is turned OFF.

The memory 30 is a storage device for storing shot still images and dynamic images, and has a storage capacity sufficient to store a predetermined number of still images or dynamic images for a predetermined period of time. Therefore, also in the case of continuous shooting in which multiple dynamic images are continuously shot or of panoramic shooting, a large number of images can be written into the memory 30 at high speed.

In addition, the memory 30 can also be used as a work area for the system control unit 50.

The compression/expansion unit 32 loads the images stored in the memory 30, applies a well-known data compression or expansion processing with the use of adaptive discrete cosine transform (ADCT), wavelet transform, or the like, and writes the processed data in the memory 30.

The exposure control unit 40 controls the shutter 12 which has an aperture function, and also provides a flash dimming function in cooperation with a flash 48.

The metering control unit 42 controls focusing of the lens 10, and a zoom control unit 44 controls zooming of the lens 10. A barrier control unit 46 controls operation of a lens barrier 102 for protecting the lens 10.

The flash 48 functions as an auxiliary light source for shooting, and also has dimming function. Furthermore, the flash 48 has a floodlighting function with AF fill light.

A redeye reduction lamp 49 is a light source for making pupils of a human as a subject smaller by emitting light for about 1 second before shooting with the flash 48. As described above, redeye effects can be reduced during flash photography by making the pupils smaller immediately before shooting.

The exposure control unit 40 and the metering control unit 42 are controlled with the use of a TTL method, and based on the result obtained by computation processing of captured image data carried out by the image processing unit 20, the system control unit 50 exercises control of the exposure control unit 40 and the metering control unit 42.

The system control unit 50 is, for example, a CPU, which executes a program stored in a memory 52 to control the entire image capturing system 100. The memory 52 stores constants, variables, programs, and the like for operation of the system control unit 50.

A display unit 54 is composed of, for example, a combination of a LCD or a LED with an output unit such as a speaker, and outputs operational states, messages, and the like with the use of characters, images, sounds, and the like, in response to execution of a program in the system control circuit 50. The display unit or display units 54 are placed in the easily visible position(s) near an operation unit 70 of the image capturing apparatus 100. In addition, a portion of the display unit 54 is placed in an optical viewfinder 104.

Information displayed on the display unit 54 includes self-timer display; display of the number of shots remaining; shutter speed display; aperture value display; exposure compensation display; flash display; redeye reduction display; in-focus display; and display of camera shake warning. A portion of the information is displayed in the optical viewfinder 104.

Furthermore, a portion of the information displayed on the display unit 54 is displayed on a LED or the like.

In addition, of the information displayed on the display unit 54, for example, a self-timer notification lamp is displayed with a lamp or the like. This self-timer notification lamp may be shared with AF fill light.

A nonvolatile memory 56 is an electrically erasable and recordable memory, for which an EEPROM or the like is used, for example.

The following components are operation members for requesting the system control unit 50 to start or end predetermined operations: A mode dial 60; a first shutter switch (SW1) 62; a second shutter switch (SW2) 64; a image display ON/OFF switch 66; a flash setting button 68; and the operation unit 70. These operation members are composed of buttons, switches, dials, touch panels, line-of-sight detectors, voice recognizers or a combination thereof.

Now, these operation members will be specifically described.

The mode dial 60 is a switch for switching and setting various functional modes such as power off; an automatic shooting mode; a program shooting mode; a panoramic shooting mode; a playback mode; a multi-screen playback/erase mode, and a PC connection mode.

The first shutter switch (SW1) 62 is turned ON with a first stroke (for example, pressing halfway) of a shutter button (not shown) provided on the image capturing apparatus 100. In a case in which the first shutter switch (SW1) 62 is turned ON, AF (autofocus) processing, AE (automatic exposure) processing, AWB (Auto White Balance) processing, EF processing, or the like is initiated.

The second shutter switch (SW2) 64 is turned ON with a second stroke (for example, pressing fully) of the shutter button provided on the image capturing apparatus 100, and instructs the initiation of a series of processes composed of exposure processing, development processing, and recoding processing. First, in the exposure processing, signals read out from the image sensor 14 are written in the memory 30 as image data via the A/D converter 16 and the memory control circuit 22. Further, this image data is subjected to development processing using computation processing at the image processing unit 20 and the memory control unit 22. Furthermore, the image data is read out from the memory 30 and compressed in the compression/expansion unit 32, and recording processing is then carried out for writing the image data in a recording medium 200 or 210.

The image display ON/OFF switch 66 is a switch for setting ON/OFF of display on the image display unit 28. When the optical viewfinder 104 is used to carry out shooting, for example, power saving can be achieved by turning OFF the display on the image display unit 28 composed of TFTs, a LCD, etc. to stop current supply.

The flash setting button 68 is a button for setting and changing operation modes of the flash. The modes which can be set in the present embodiment include an automatic mode, a normally emitting mode, a redeye reduction automatic mode, and a normally emitting (redeye reduction) mode. The automatic mode refers to a mode in which flash is automatically emitted for shooting depending on the brightness of the subject. The normally emitting mode refers to a mode in which flash is always emitted for shooting. The redeye reduction automatic mode refers to a mode in which flash is automatically emitted for shooting depending on the brightness of the subject while the redeye reduction lamp is always lighted when flash is emitted. The normally emitting (redeye reduction) mode refers to a mode in which light from the redeye reduction lamp and stroboscopic light are always emitted for shooting.

The operation unit 70 is composed of various buttons, touch panels, etc., which includes, for example, a menu button; a set button; a menu displacement button, a shooting image quality selection button; an exposure compensation button; and a compression mode switch.

The compression mode switch is a switch for selecting the compression rate of JPEG (Joint Photographic Expert Group) compression or selecting a RAW mode, in which signals from the image sensor are directly digitalized and recorded on a recording medium.

In the present embodiment, for example, a normal mode and a fine mode are prepared as the mode for the JPEG compression. The user of the image capturing apparatus 100 can select for shooting, either the normal mode in a case in which emphasis is placed on the data size of shot images, or the fine mode in a case in which emphasis is placed on the image quality of shot images.

In the mode for the JPEG compression, the compression/expansion unit 32 reads out image data written in the memory 30, compresses the image data to a predetermined compression rate, and then records the compressed image data, for example, on the recording medium 200.

In the RAW mode, depending on the pixel array for a color filter of the image sensor 14, image data is directly read out for each line, image data written in the memory 30 is read out via the A/D converter 16 and the memory control unit 22, and the image data is recorded on the recording medium 200.

A power supply control unit 80 is composed of a battery detection unit, a DC-DC converter, a switch unit for switching a block to which power is to be distributed, and the like. The power supply control unit 80 detects the presence or absence of a battery installed, the type of battery, the remaining battery capacity, controls the DC-DC converter based on the result of the detection and on instructions from the system control circuit 50, and supplies required voltages to a range of units including the recording medium for a required period of time.

A power supply 86 is composed of a primary battery such as an alkaline battery or a lithium battery, a secondary battery such as a NiCd battery, a NiMH battery or a Li battery, an AC adapter, or the like, and is mounted on the image capturing apparatus 100 with connectors 82 and 84.

The recording media 200 and 210 such as a memory card or a hard disk include recording units 202 and 212 composed of semiconductor memories, magnetic disks, or the like, interfaces 204 and 214 with the image capturing apparatus 100, and connectors 206 and 216. The recording media 200 and 210 are mounted on the image capturing apparatus 100 via the connectors 206 and 216 on the medium side and connectors 92 and 96 on the image capturing apparatus 100 side. Interfaces 90 and 94 are connected to the connectors 92 and 96. The presence or absence of the recording media 200 and 210 installed is detected by a detachable recording medium detection unit 98.

It is to be noted that the present embodiment has been described with the assumption that the image capturing apparatus 100 has two systems of interfaces and connectors for mounting the recording media. However, any number of interfaces and connectors, including a single interface and a single connector, may be provided for mounting the recording media. In addition, differently standardized interfaces and connectors may be used for each system.

Image data and management information accompanying the image data can be mutually transferred to and from other peripherals such as computers and printers by connecting a variety of communication cards to the connectors 92 and 96.

The lens barrier 102 covers the image capturing unit of the image capturing apparatus 100, including the lens 10, to prevent the image capturing unit from being contaminated or broken.

The optical viewfinder 104 is, for example, a TTL viewfinder, which forms an image of light rays passing through the lens 10 with the use of a prism or a mirror. The use of the optical viewfinder 104 allows shooting to be carried out without the use of the electronic viewfinder function of the image display unit 28. In addition, as described above, information on a portion of the functions of the display unit 54, for example, focus display, camera shake warning, and the like, is displayed in the optical view finder 104.

A communication unit 110 carries out communication processing based on various standards, e.g., radio communication such as RS232C, USB, IEEE1394, P1284, SCSI, modems, LAN, IEEE802.11x.

A connector (an antenna in the case of radio communication) 112 connects the image capturing apparatus 100 to other devices via the communication unit 110.

Figure 2:
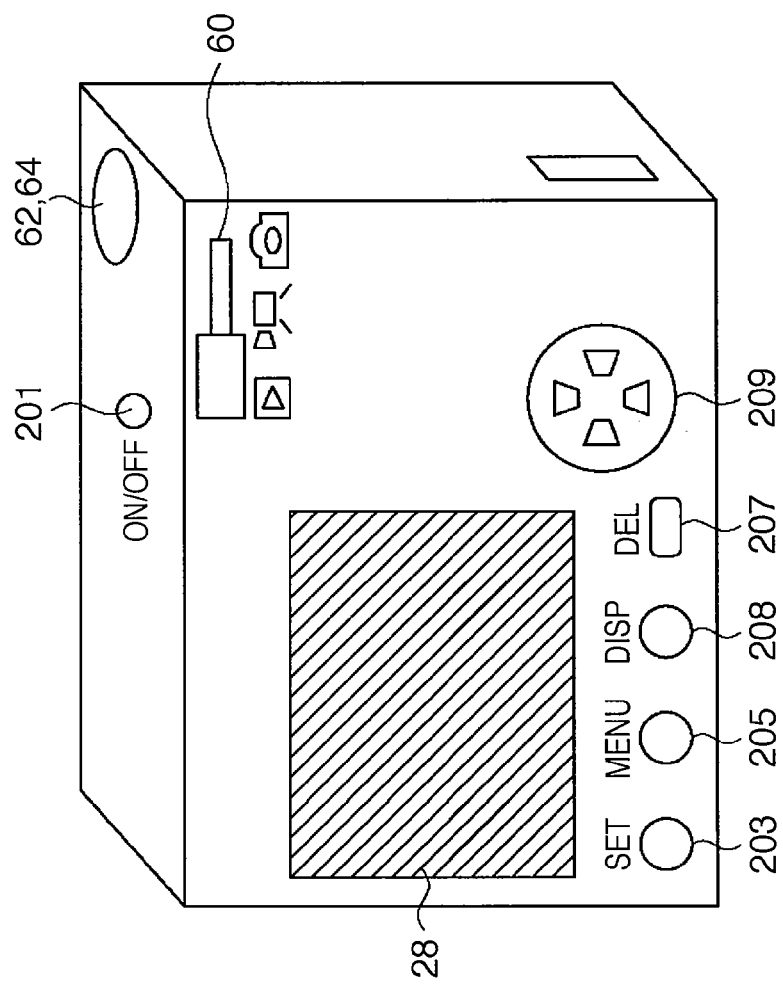
FIG. 2 is a perspective view illustrating an example of the appearance of the image capturing apparatus 100 which has the configuration in FIG. 1.

FIG. 2 is a perspective view illustrating an example of the appearance of the image capturing apparatus 100 which has the configuration in FIG. 1, where the same structures as those shown in FIG. 1 are denoted by the same reference numerals.

A power supply button 201 is a button for turning the image capturing apparatus 100 on or off. A MENU button 205 is a button for displaying a menu screen which is used for changing shooting parameters or camera settings, or for stopping the display of the menu screen. A SET button 203 is used for determining set values or for determining menu items. An erase button 207 is used for requesting erase of captured images. A DISP button 208 is a button for switching combinatorial information to be displayed on the image display unit 28. A cross button 209 is composed of left, right, top, and bottom buttons, which is used for transition of menu screens or displacement of selected items, or for switching of displayed images in a playback mode. These buttons are included in the operation unit 70.

(Image Capturing and Recording Processing)

Figure 3:
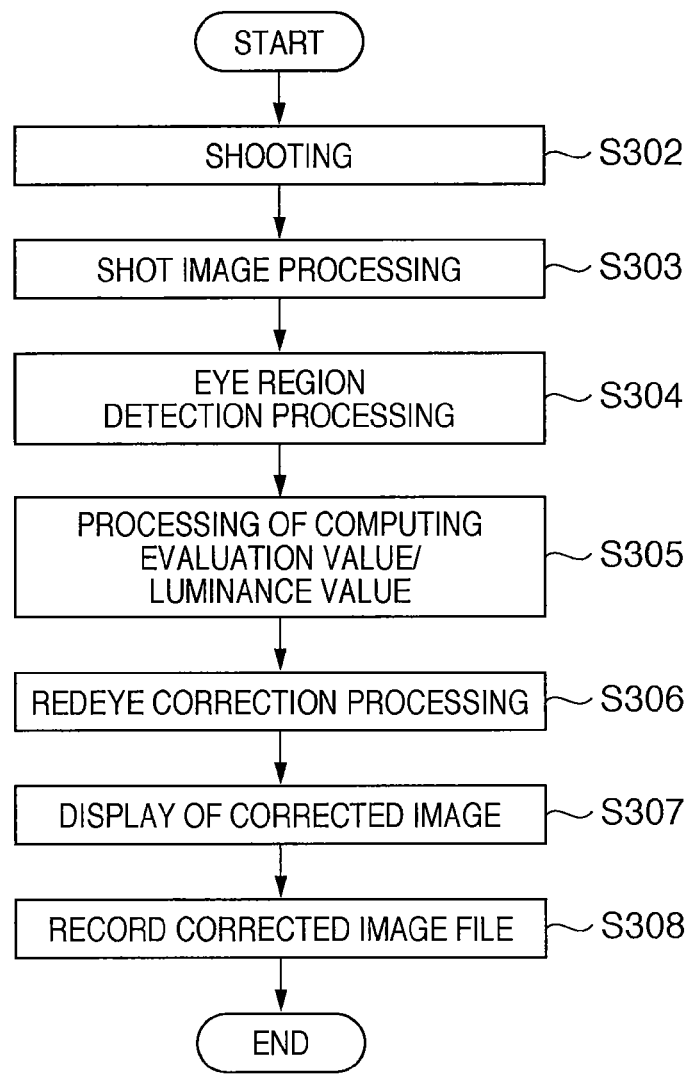
FIG. 3 is a flow chart for explaining the overall flow of image capturing and recording processing in the image capturing apparatus according to the first embodiment of the present invention.

FIG. 3 is a flow chart for explaining the overall flow of image capturing and recording processing in the image capturing apparatus according to the present embodiment.

In the present embodiment, it will be assumed that redeye correction processing is carried out at the time of capturing images, and corrected images are saved on the recording medium. However, needless to say, redeye correction processing can be carried out even at the time of playing back the images saved on the recording medium, rather than at the time of shooting.

When the shutter button is fully pressed to turn SW2 ON, shooting processing is carried out (S302). Subject images converted into analog electrical signals by the image sensor 14 are converted into digital signals by the A/D converter 16. Then, the digital signals output by the A/D converter 16 are subjected to shot image processing in the image processing unit 20 (S303).

Although details are omitted here, this shot image processing involves processing for converting signals read out from the image sensor 14 into pixel-by-pixel image data represented by a luminance component Y and a color difference component UV, on the basis of, for example, the arrangement of color filters.

Next, the image processing unit 20 uses the image data to carry out eye region detection processing for detecting a partial region (eye region) including a region considered as the eyes of a human in the captured image (S304).

The eye region detection processing may be carried out by any approach. However, for example, pattern matching with a geometric model as described in Japanese Patent Laid-Open No. 2001-309225 can be used to carry out the eye region detection processing.

When the eye region is detected by the eye region detection processing, the image processing unit 20 carries out redeye correction processing. Specifically, the evaluation value indicating the redness of each pixel in the eye region detected by the eye region detection processing and the luminance value of a surrounding region around the eyes are first computed (S305). Then, the redeye correction processing for correcting the values for the pixels included in the detected eye region is applied with the use of the evaluation value and the luminance value (S306).

The image processing unit 20 outputs the image data subjected to the redeye correction processing to the memory 30 through the memory control unit 22. The memory control unit 22 writes the image data from the image processing unit 20 into the image display memory 24 in accordance with the resolution of the image display unit 28, thereby resulting in the corrected image being displayed on the image display unit 28 (quick review operation) (S307). On the other hand, the image data written in the memory 30 is encoded by the compression/expansion unit 32, for example, into a JPEG format. Then, the encoded image data is recorded on the recording medium 200 or 210, for example, in accordance with the DCF standard, in response to control exercised by the system control unit 50 (S308).

It is to be noted that in a case in which no eye region is detected in S304, the processing of computing the evaluation value and the luminance value in S305 and the redeye correction processing in S306 are skipped, and uncorrected images are displayed and recorded in S307 and S308.

(Redeye Correction Processing)

Next, the redeye correction processing carried out by the image processing unit 20 in S306 of FIG. 3 will be described in detail.

Figure 4:
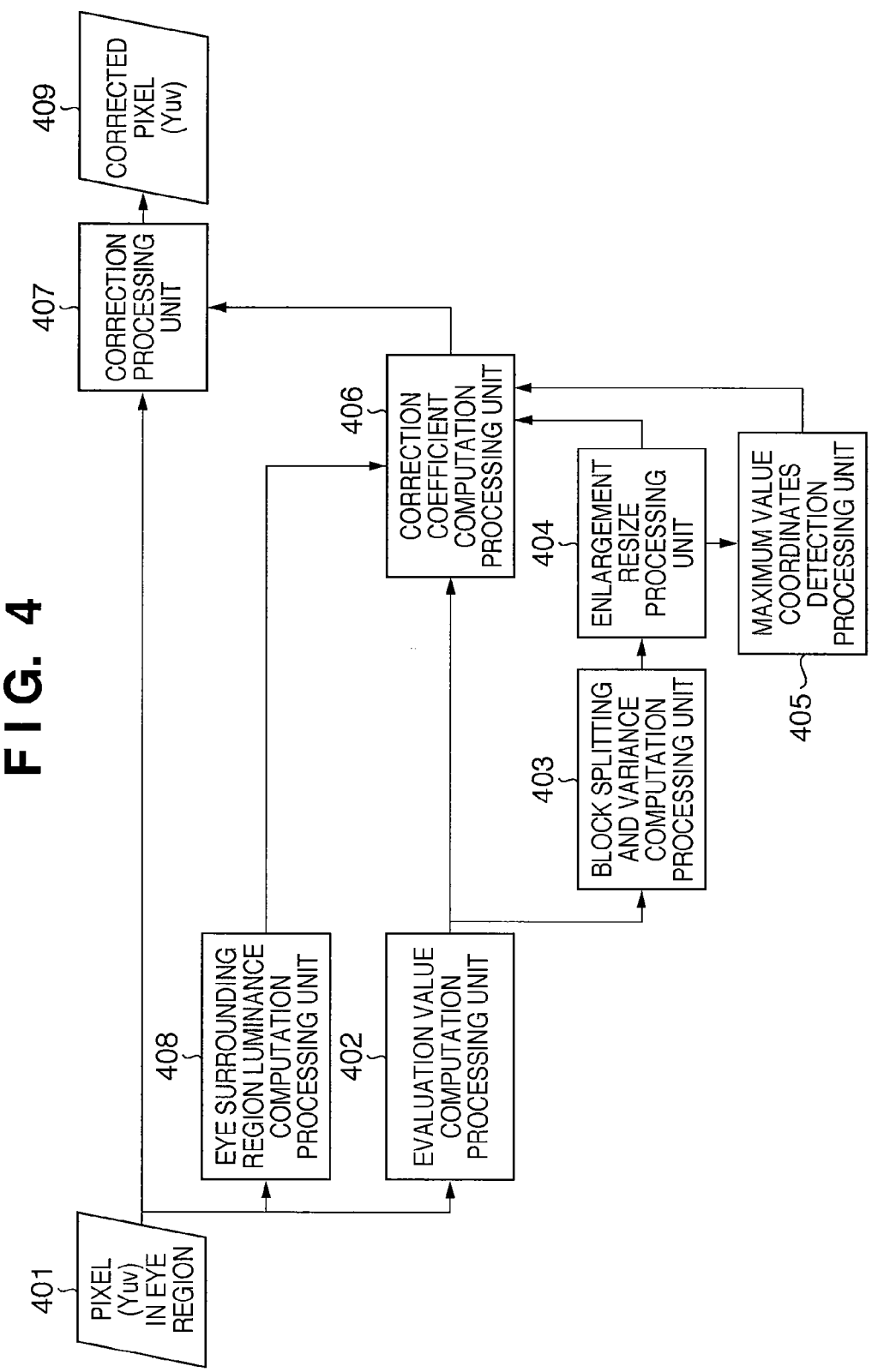
FIG. 4 is a diagram schematically illustrating internal processing constituting redeye correction processing and a flow of signals in the image capturing apparatus according to the first embodiment of the present invention.

FIG. 4 is a diagram schematically illustrating internal processing constituting the redeye correction processing and a flow of signals in the image capturing apparatus according to the present embodiment. The functions of each processing unit in FIG. 4 are implemented by the image processing unit 20, for example, as software.

As described above, the image processing unit 20 detects an eye region in S304 of FIG. 3. Then, the image processing unit 20 supplies pixel data 401 (in Yuv format) contained in the eye region to an evaluation value computation processing unit 402, where the eye region has a rectangular shape with the number W of pixels in horizontal width and the number H of pixels in vertical width.

The evaluation value computation processing unit 402 uses the following formulas to perform conversion into a RGB format and compute an evaluation value E, for each pixel for pixel data 401.

$$E = (2*R - G - B)/(2Y) \tag{1}$$

$$R = Y + 1.402*V \tag{2}$$

$$G = Y - 0.344*U - 0.714*V \tag{3}$$

$$B = Y + 1.772*U \tag{4}$$

As is clear from the formula (I), the redder the pixel (the stronger the redness is) and the smaller the luminance, the more the evaluation value E is increased. The evaluation value computation processing unit 402 outputs the computed evaluation value E to a block splitting and variance computation processing unit 403 and a correction coefficient computation processing unit 406.

The block splitting and variance computation processing unit 403 as a splitting unit and a measure computation unit splits the eye region into multiple regions (blocks), and computes the variance D of the evaluation value E for the pixels included in the individual blocks. The blocks are set to a size such that a redeye region (that is, a pupil region) is included within one block. The specific size of the block can be set by any method, and can be set in advance, for example, in consideration of the statistical size of a redeye region. Alternatively, the size of the eye region can be determined in consideration of the size of the block.

Figure 5:
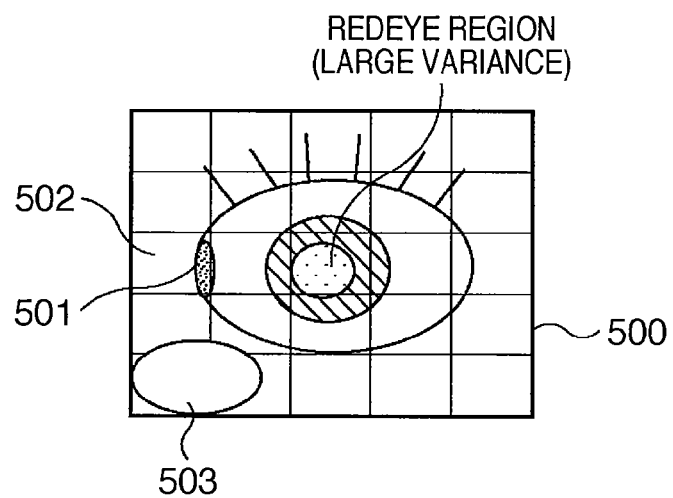
FIG. 5 is a diagram illustrating an example of splitting an eye region in the image capturing apparatus according to the first embodiment of the present invention.

In the present embodiment, it will be assumed that, as shown in FIG. 5, an eye region 500 is split into 25 blocks in total, 5 blocks in the horizontal direction and 5 blocks in the vertical direction, and the variance D of the evaluation values E for each block is computed. The variance D is computed with the use of the following formulas (5) and (6).

$$Ave = \sum_{I=1}^{N} E(I)/N \tag{5}$$

$$D = \sum_{I=1}^{N} ((E(I) - Ave) \times (E(I) - Ave))/N \tag{6}$$

In the formulas, E(I) represents individual evaluation values, and N represents the number of pixels included in the block.

The block splitting and variance computation processing unit 403 outputs the computed variance D for each block to an enlargement resize processing unit 404.

The enlargement resize processing unit 404 carries out enlargement resize by, for example, linear interpolation of the 25 (5×5) variants D computed for each block into W (horizontal width W)×H (vertical width H) pieces of data. The variance dada resized to W×H pieces of data is output to a maximum-value coordinates detection processing unit 405 and a correction coefficient computation processing unit 406.

The maximum-value coordinates detection processing unit 405 as a position detecting unit detects the pixel position (MaxX, MaxY) of the data with the maximum value from the variance data subjected to enlargement resize. Then, the maximum-value coordinates detection processing unit 405 outputs the detected pixel position to the correction coefficient computation processing unit 406.

Figure 8:
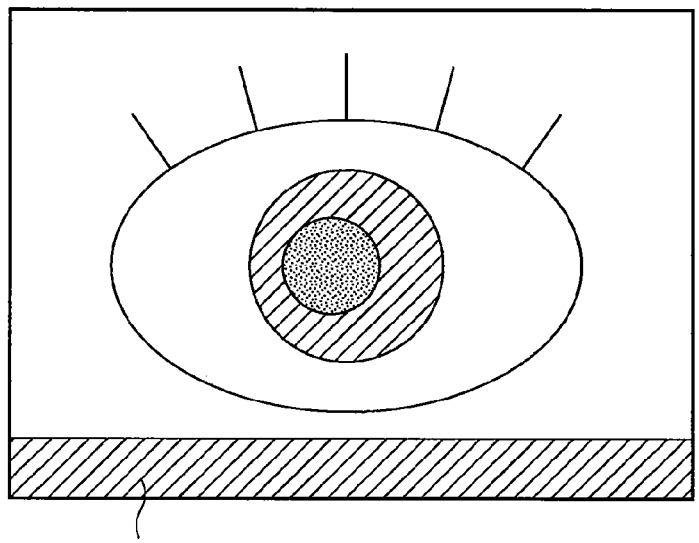
FIG. 8 is a diagram illustrating an example of an eye surrounding region luminance Ye computed by the image capturing apparatus according to the first embodiment of the present invention.

An eye surrounding region luminance computation processing unit 408 computes an eye surrounding region luminance Ye as an example of the luminance value of a surrounding region around the eye in the image. Specifically, the eye surrounding region luminance computation processing unit 408 computes, as shown in FIG. 8, an average luminance for a lower portion of the detected eye region as the eye surrounding region luminance Ye. More specifically, in the present embodiment, the eye surrounding region luminance computation processing unit 408 computes the average value for a line of luminance of the base of the eye region as eye surrounding region luminance. The thus computed eye surrounding region luminance Ye is output to the correction coefficient computation processing unit 406. The eye surrounding region luminance computation processing unit 408 uses a lower portion of the detected eye region because it is believed that there is a possibility that an upper portion of the eye region includes eyebrows whereas right and left portions thereof include hair, and that the most stable value can be obtained from the lower portion of the eye region.

The correction coefficient computation processing unit 406 computes a correction coefficient from the eye surrounding region luminance Ye, the variance data resized to W×H pieces of data, and the pixel position (MaxX, MaxY) of the variance data with the maximum value. The calculation of the correction coefficient will be described in detail below.

Figure 6:
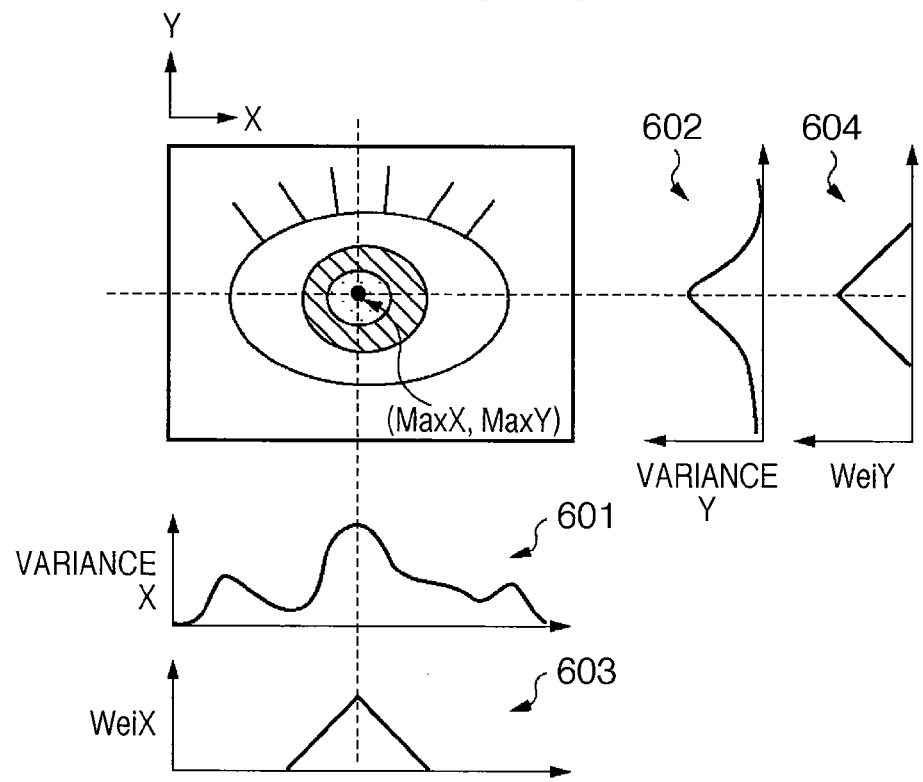
FIG. 6 is a diagram illustrating an eye region with a redeye effect caused and distribution examples for the variance computed by the image capturing apparatus according to the first embodiment.

FIG. 6 is a diagram illustrating an eye region with a redeye effect caused and distribution examples for the variance.

In FIG. 6, reference numeral 601 denotes a variance distribution in the X axis at Y=MaxY, where the horizontal axis indicates an x coordinate whereas the vertical axis indicates the magnitude of the variance. Further, reference numeral 602 denotes a variance distribution in the Y axis at X=MaxX, where the horizontal axis indicates a y coordinate whereas the vertical axis indicates the magnitude of the variance.

Figure 7:
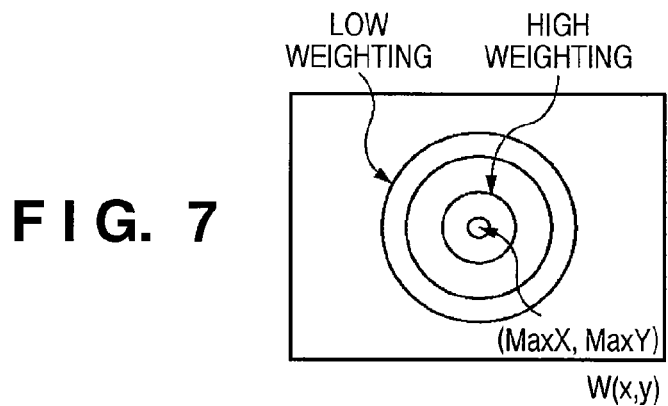
FIG. 7 is a diagram illustrating a distribution example for the magnitude of a weighting factor determined by the image capturing apparatus according to the first embodiment of the present invention.

The correction coefficient computation processing unit 406 determines a weighting factor in accordance with the distance from the pixel position (MaxX, MaxY) detected by the maximum-value coordinates detection processing unit 405. Specifically, as shown in FIG. 7, the closer to the pixel position (MaxX, MaxY), the larger the weighting factor determined.

Reference numeral 603 in FIG. 6 denotes a weighting factor distribution in the X axis at Y=MaxY, where the horizontal axis indicates an x coordinate whereas the vertical axis indicates the magnitude of the weighting factor. Further, reference numeral 604 denotes a weighting factor distribution in the Y axis at X=MaxX, where the horizontal axis indicates a y coordinate whereas the vertical axis indicates the magnitude of the weighting factor. In the example shown in FIG. 6, the weighting factor is determined so as to linearly decrease in proportion to the distance from the pixel position (MaxX, MaxY).

Figure 9:
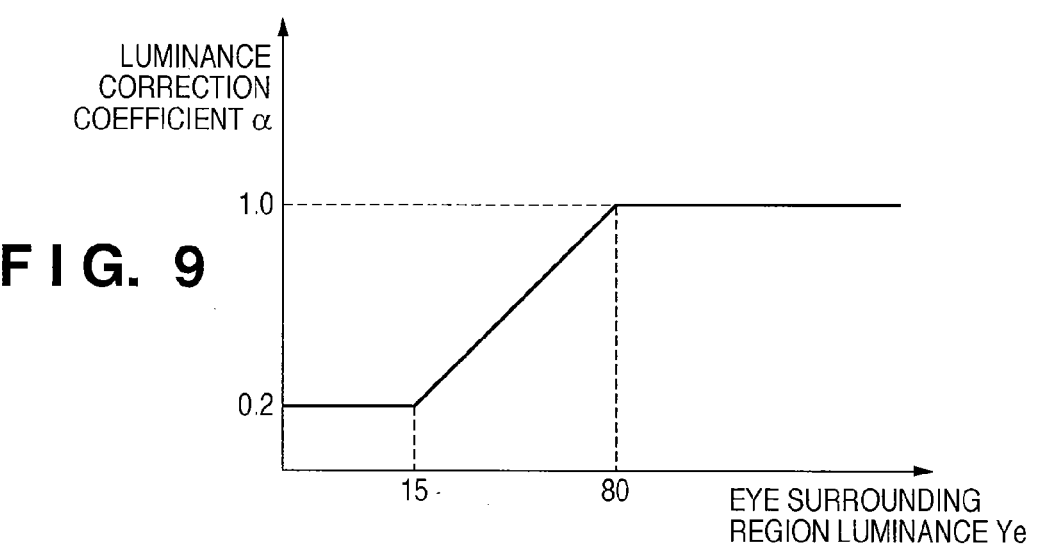
FIG. 9 is a diagram illustrating an example of the relationship between a luminance correction coefficient α and the eye surrounding region luminance Ye in the first embodiment of the present invention.

Furthermore, the correction coefficient computation processing unit 406 computes a luminance correction coefficient $\alpha$ from the eye surrounding region luminance Ye. The luminance correction coefficient $\alpha$, takes a maximum value of 1, and is set in such a way that the lower the eye surrounding region luminance Ye, the smaller the luminance correction coefficient $\alpha$ is, or the higher the eye surrounding region luminance Ye, the larger the luminance correction coefficient $\alpha$ is. FIG. 9 is a diagram illustrating an example of the relationship between the luminance correction coefficient $\alpha$ and the eye surrounding region luminance Ye in the present embodiment. As shown in FIG. 9, the luminance correction coefficient $\alpha$ has a minimum value set to 0.2 in the present embodiment. The correction coefficient computation processing unit 406 can store in advance, for example, a table showing the relationship in FIG. 9, and compute the luminance correction coefficient $\alpha$ corresponding to the value of the eye surrounding region luminance Ye. In a case in which the value of the eye surrounding region luminance Ye is smaller than a predetermined value, the luminance correction coefficient $\alpha$ may be a coefficient which renders the value smaller than in the case of the predetermined value or more.

Then, the correction coefficient computation processing unit 406 computes a correction coefficient C(x, y) in accordance with the following formula (7) with the use of the evaluation value E (x, y) from the evaluation value computation processing unit 402, the data D(x, y) obtained by enlargement resize processing of the variance, the weighting factor W (x, y) and the luminance correction coefficient $\alpha$.

$$C(x,y)=E(x,y)\times D(x,y)\times W(x,y)\times \alpha. \quad (7)$$

In the formula (7), (x, y) denotes coordinates in the eye region, and is $1 \leq x \leq W$ and $1 \leq y \leq H$ in this example. In addition, $0 \leq c(x, y) \leq 1$ is employed.

As described above, the correction coefficient C is increased with increase in the evaluation value E, with increase in the variance D, or with increase in the weighting factor W. Furthermore, in a case in which the eye surrounding region luminance Ye is smaller, the correction coefficient C is corrected so as to be smaller.

The correction coefficient C computed in the correction coefficient computation processing unit 406 is output to a correction processing unit 407. The correction processing unit 407 executes redeye correction processing by applying the correction coefficient C to the pixel data 401 for the eye region. Specifically, on the assumption that the luminance component of the pixel data 401 in the Yuv format is represented by Y(x, y), the color components thereof are represented by U(x, y) and V(x, y), and the color components of the corrected pixel data are represented by U'(x, y) and V'(x, y), the correction processing unit 407 corrects the color saturation of the pixel data in accordance with the following formulas (8) and (9).

$$U'(x,y)=U(x,y)\times(1-C(x,y)) \quad (8)$$

$$V'(x,y)=V(x,y)\times(1-C(x,y)) \quad (9)$$

The smaller the correction coefficient C, that is, the smaller the evaluation value E, the variance D, the weighting factor W, or the eye surrounding region luminance Ye, the smaller the amount of correction for the color components U and V, resulting in a smaller difference between the color components U and V and the color components U' and V'.

The correction processing unit 407 uses the corrected pixel data 409 to overwrite the corresponding the eye region data in the captured image data.

When the processing described above is executed for all of the other eye regions, the redeye correction processing is completed.

While each eye region is split into 5×5 blocks in the present embodiment, the number of blocks is not limited to 5×5. Each eye region may be more compartmentalized, such as 9×9, or the numbers of blocks in the horizontal direction and vertical direction can be set to different values from each other, such as 9×7. Furthermore, the numbers of blocks may be varied depending on the accuracy of the detection algorithm for eye regions. For example, in the case of using a detection method by which the positions of pupils can be detected with a high degree of accuracy, the reduction in processing time can be achieved by setting a relatively small eye region for a region which is considered to include eyes to reduce the number of blocks. Alternatively, even in the case of the same detection algorithm for eye regions, eye regions can be set to have a smaller size with higher reliability for the detection result of an obtained eye region.

Furthermore, in the present embodiment, the redness of the pixels included in a redeye region is reduced by more substantially reducing the color components of the pixel data with increase in the correction coefficient in the correction processing unit 407. However, for example, it is also possible to set corrected target color components Ut and Vt and make corrections in accordance with the following formulas.

$$U'(x,y)=U(x,y)\times(1-C(x,y))+Ut\times C(x,y) \quad (10)$$

$$V'(x,y)=V(x,y)\times(1-C(x,y))+Vt\times C(x,y) \quad (11)$$

Furthermore, the variance for the evaluation value E is used as an example of a measure of the degree of variation for the evaluation value E in the present embodiment. However, any value, including standard deviations, can be used instead which is available as a measure of the degree of variation for the evaluation value E with respect to the pixels included in a block.

Furthermore, while the image capturing apparatus has been described as an example of the image processing apparatus in the present embodiment, the present invention is applicable to any apparatus, including printers and information processing apparatuses, which is available for read eye correction processing.

As described above, according to the present embodiment, the correction accuracy for redeye regions with their color saturation and luminance low can be improved by using the evaluation value normalized with the luminance as an evaluation value indicative of the degree of redness of the pixels. Further, in a case in which the eye surrounding region luminance is low, false corrections in not only redeye regions but also images with dark surroundings (for example, images with underexposure) can be prevented by using in combination a luminance correction coefficient for reducing the decrease in color components due to correction.

In the present embodiment, the configuration has been described in which the evaluation value E normalized with the luminance is corrected with the degree of variation for the evaluation value E. However, the advantageous effect of the prevention of false corrections in generally dark images in the case of using the evaluation value E normalized with the luminance can be achieved by only the introduction of the correction coefficient α in accordance with the eye surrounding region luminance Ye. In other words, the process of correcting the evaluation value E depending on the degree of variation for the evaluation value E is not indispensable in the present invention.

Furthermore, even in a case in which the evaluation value E is corrected in accordance with the degree of variation for the evaluation value E, weighting in accordance with the distance from the pixel position with the maximum degree of variation is not indispensable.

However, taking the variation of the evaluation value into consideration or carrying out weighting has an advantageous effect of being able to prevent false corrections due to other factors.

For example, in FIG. 5, the pixels in an eye corner region 501 that is a bloodshot portion of the eye have a large evaluation value E because the pixels are heavily tinged with red, while the evaluation value E has a small degree of variation with respect to a block 502 including the portion. Therefore, the evaluation value with respect to the eye corner region 501 is reduced due to the small degree of variation, resulting in a small correction coefficient. Further, for a relatively large area composed of pixels of about the same color, such as a flesh region 503, the evaluation value in a block also has a smaller degree of variation, thus resulting in a small correction coefficient.

More specifically, the magnitude of the evaluation value E is modified depending on the degree of variation for the evaluation value E computed for the block including those pixels, and computed with the correction coefficient, thereby allowing the amount of correction for red pixels in a region which is small in the degree of variation, such as an eye region or a flesh region, to be prevented from increasing.

Furthermore, the correction coefficient for the eye corner region 501 or the flesh region 503 is further decreased by modifying the evaluation value also with weighting (a weighting coefficient) which is decreased with increase in the distance from the coordinates (pixel position) with the maximum degree of variation. In addition, gradual variation of the weighting makes a boundary division between a corrected region and an uncorrected region less noticeable, allowing artificiality to be reduced.

On the contrary, since the degree of variation for the evaluation value is larger in a block including a redeye region and an iris region around the redeye region, a correction coefficient is obtained for carrying out a sufficient amount of correction, so that effective correction can be achieved. Furthermore, if the coordinates with the maximum degree of variation is regarded as the center of the redeye region to carry out weighting such that the correction coefficient is decreased with increase in the distance from the coordinates, the amount of correction is increased for the redeye region whereas the amount of correction is decreased for the surrounding iris region. Therefore, false corrections can be prevented more effectively.

Second Embodiment

Next, a second embodiment of the present invention will be described mainly with reference to respects different from the first embodiment. The present embodiment is characterized in that the average luminance of a face region is used as another example of the luminance value of a surrounding region around an eye in an image.

(Image Capturing and Recording Processing)

Figure 10:
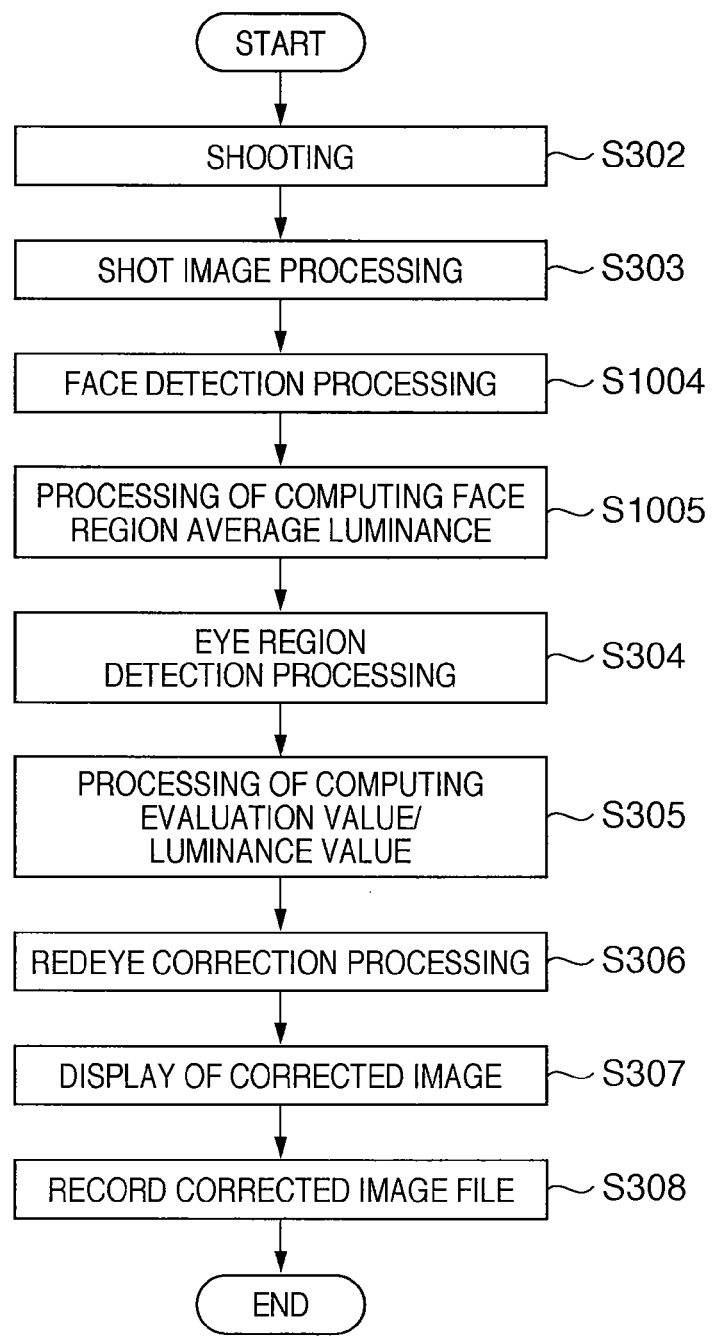
FIG. 10 is a flow chart for explaining the overall flow of image capturing and recording processing in an image capturing apparatus according to a second embodiment of the present invention.

FIG. 10 is a flow chart for explaining the overall flow of image capturing and recording processing in the image capturing apparatus according to the present embodiment. In FIG. 10, the same processing steps as those in the first embodiment are denoted by the same reference numerals as those in FIG. 3, and description of the same processing steps will be thus omitted.

Also in the present embodiment, it will be assumed that redeye correction processing is carried out at the time of capturing images, and corrected images are saved on the recording medium. However, needless to say, redeye correction processing can be executed at any time rather than at the time of shooting.

Following the shot image processing in S303, the image processing unit 20 uses the image data to carry out face detection processing for detecting a region (face region) considered as a face in the captured image (S1004).

The face detection processing may be carried out by any approach. However, for example, in the same way as in the first embodiment, pattern matching with a geometric face model as described in Japanese Patent Laid-Open No. 2001-309225 can be used to carry out the face detection processing. Furthermore, it is possible to compute the degree of face reliability as a measure of how much the face region corresponds to a face, on the basis of degree of coincidence (the degree of similarity) between the model and the image region in the pattern matching.

In the present embodiment, it will be assumed that the image processing unit 20 computes 10-level degrees of face reliability, 1 to 10. The degree of reliability 1 refers to the highest degree of coincidence in pattern matching, which is most likely to indicate a face, whereas the degree of reliability 10 refers to the lowest degree of coincidence in pattern matching, which is least likely to indicate a face.

Furthermore, the image processing unit 20 also computes the size of the detected face region (the face size). In the present embodiment, it will be assumed that the image processing unit 20 computes, as the face size, larger one of the maximum numbers of pixels in the horizontal direction and vertical direction of the face region.

It will be assumed that the image processing unit 20 uses, as a finally detected face region, a face region which has a degree of reliability of threshold FR set in advance (3 in the present embodiment) or less and has a face size of threshold FS (200 in the present embodiment) or more, among detected face regions.

When the face region is detected by the face detection processing, the image processing unit 20 computes an average luminance value Yf for the detected face region as the luminance value of a surrounding region around an eye in the image (S1005).

Figure 11:
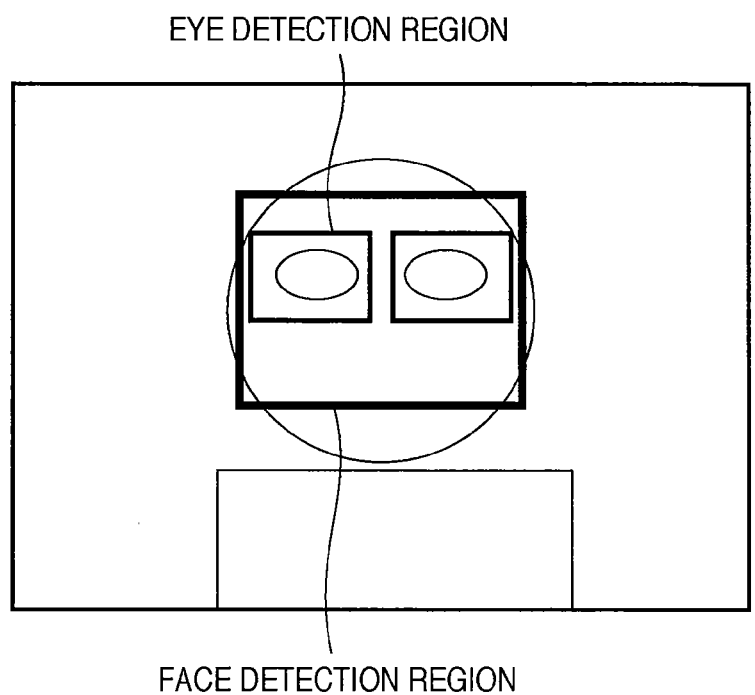
FIG. 11 is a diagram illustrating an example of the detection range for an eye region in the image capturing apparatus according to the second embodiment of the present invention.

Furthermore, the image processing unit 20 detects an eye region from the detected face region (S304). In the present embodiment, the image processing unit 20 detects as an eye region, as shown in FIG. 11, a location set in advance on the basis of the detected face region.

Then, the image processing unit 20 computes the evaluation value indicating the redness of each pixel in the detected eye region and the luminance value of a surrounding region around the eye (S305). Then, redeye correction processing is applied to the detected eye region with the use of the evaluation value and the luminance value (S306). The present embodiment differs from the first embodiment in that corrections are made depending on the value of the face region average luminance Yf as the coefficient for use in the redeye correction processing, rather than the value of the eye surrounding region luminance Ye. This difference will be described later.

Since the subsequent processing is similar to that in the first embodiment, description of the subsequent processing will be omitted.

It is to be noted that in a case in which no face region is detected in S304 in the present embodiment, the evaluation value/luminance computation processing in S305 and the redeye correction processing in S306 are skipped, and uncorrected images are displayed and recorded in S307 and S308.

(Redeye Correction Processing)

Next, the evaluation value/luminance computation processing carried out by the image processing unit 20 in S305 of FIG. 10 will be described in detail.

Figure 12:
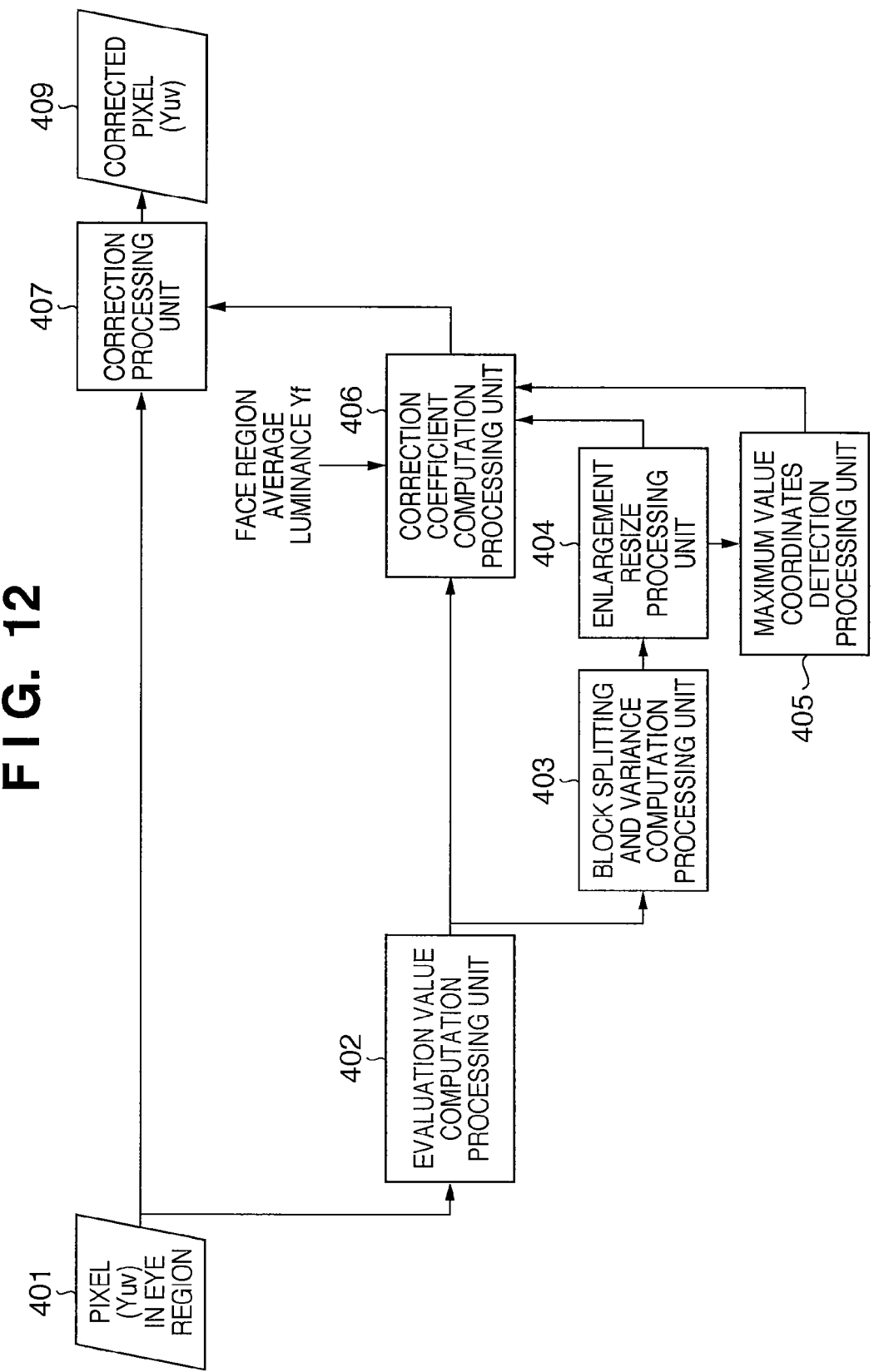
FIG. 12 is a diagram schematically illustrating internal processing constituting redeye correction processing and a flow of signals in the image capturing apparatus according to the second embodiment of the present invention.

FIG. 12 is a diagram schematically illustrating internal processing constituting redeye correction processing and a flow of signals in the image capturing apparatus according to the present embodiment. The functions of each processing unit in FIG. 12 are implemented by the image processing unit 20, for example, as software. In addition, in FIG. 12, the same components as those in the first embodiment are denoted by the same reference numerals as those in FIG. 4, and repeated description of the same components will be thus omitted.

As described above, the present embodiment differs from the first embodiment in that the present embodiment has no eye surrounding region luminance computation processing unit 408, and that the correction coefficient computation processing unit 406 corrects the correction coefficient with the use of a luminance correction coefficient β on the basis of the face region average luminance Yf computed in S1005, instead of the eye surrounding region luminance Ye.

Figure 13:
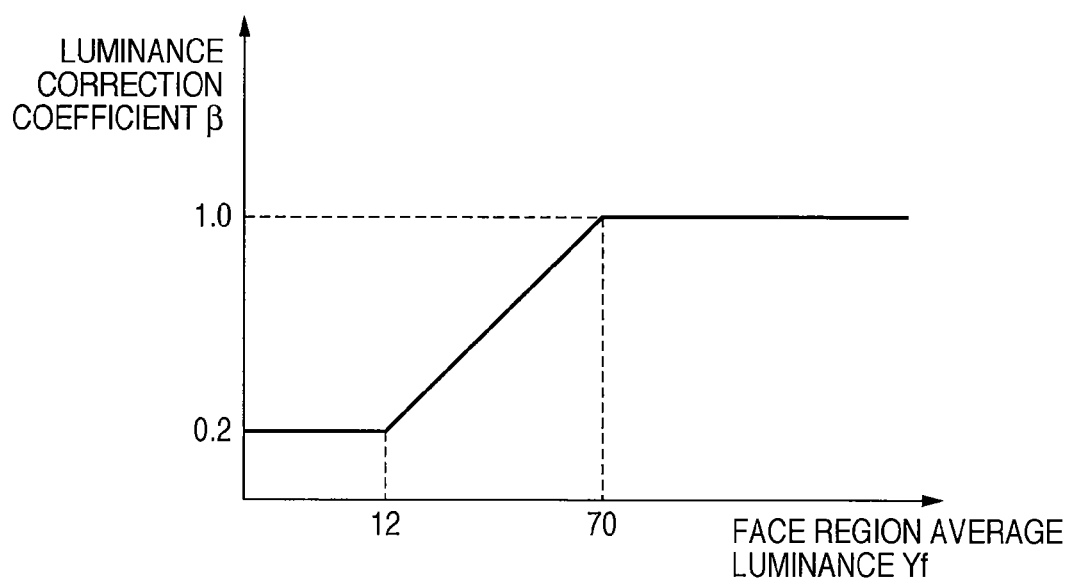
FIG. 13 is a diagram illustrating an example of the relationship between a luminance correction coefficient β and a face region average luminance Yf in the second embodiment of the present invention.

The luminance correction coefficient β takes the maximum value of 1 as in the luminance correction coefficient β in the first embodiment, and is set to decrease with decrease in the face region average luminance Yf or to increase with increase in the face region average luminance Yf. FIG. 13 is a diagram illustrating an example of the relationship between a luminance correction coefficient β and a face region average luminance Yf in the present embodiment. As shown in FIG. 13, the minimum value of the luminance correction coefficient β is set to 0.2 in the present embodiment. The correction coefficient computation processing unit 406 can, for example, store in advance a table which shows the relationship in FIG. 13, and compute the luminance correction coefficient β corresponding to the value of the face region average luminance Yf. In a case in which the face region average luminance Yf has a smaller value than a predetermined value, the luminance correction coefficient β may be a coefficient which renders the value smaller than in the case of the predetermined value or more.

Then, the correction coefficient computation processing unit 406 computes a correction coefficient C(x, y) in accordance with the following formula (12) with the use of the evaluation value E (x, y) from the evaluation value computation processing unit 402, the data D(x, y) obtained by enlargement resize processing of the variance, the weighting factor W (x, y) and the luminance correction coefficient β.

$$C(x,y)=E(x,y) \times D(x,y) \times W(x,y) \times \beta \quad (12)$$

In the formula (12), (x, y) denotes coordinates in the eye region, and is $1 \leq x \leq W$ and $1 \leq y \leq H$ in this example. In addition, $0 \leq c(x, y) \leq 1$ is employed.

As described above, the correction coefficient C is increased with increase in the evaluation value E, with increase in the variance D, or with increase in the weighting factor W. Furthermore, in a case in which the eye region average luminance Yf is smaller, the correction coefficient C is corrected so as to be smaller.

As described above, in the present embodiment, the face detection processing is carried out, and the face region average luminance Yf is used, instead of the eye surrounding region luminance Ye, as a measure for determining whether or not the face region is a generally dark image.

The second embodiment can also achieves the same advantages as those achieved by the first embodiment.

Third Embodiment

Next, a third embodiment of the present invention will be described mainly with reference to respects different from the first and second embodiments.

Figure 14:
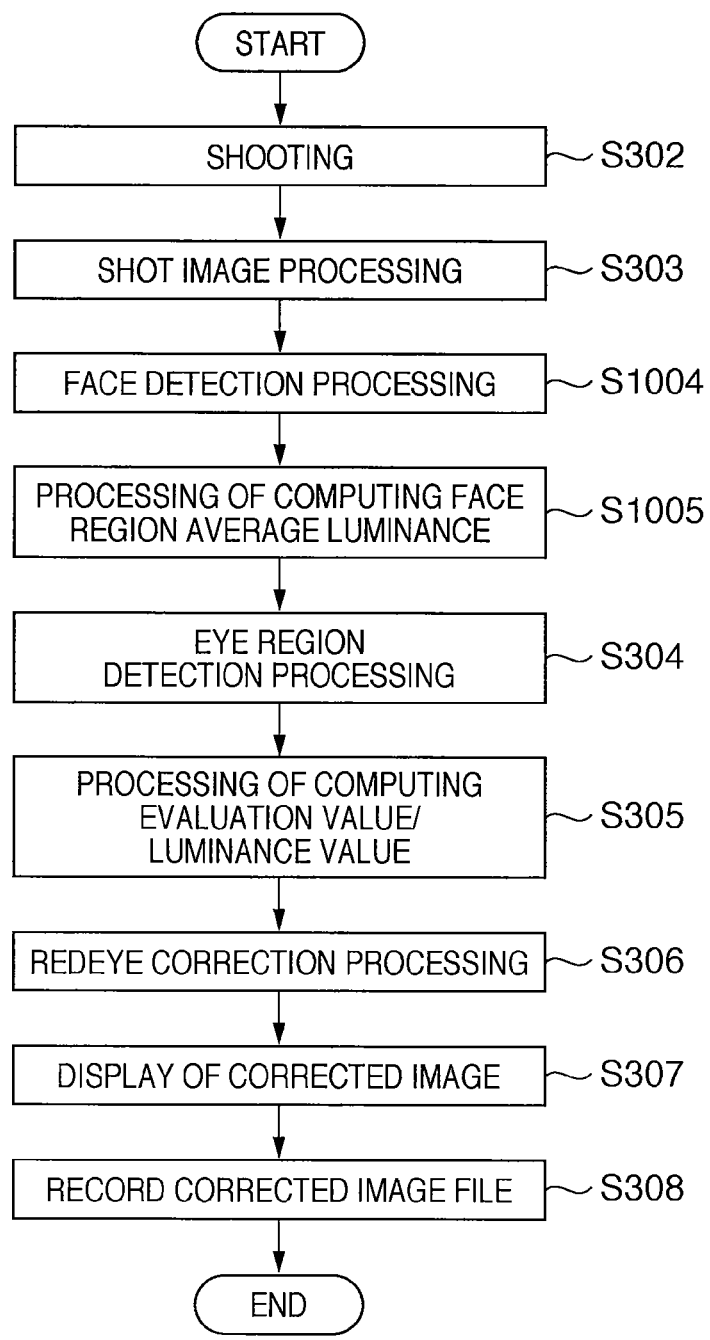
FIG. 14 is a flow chart for explaining the overall flow of image capturing and recording processing in an image capturing apparatus according to a third embodiment of the present invention.

FIG. 14 is a flow chart for explaining the overall flow of image capturing and recording processing in an image capturing apparatus according to the present embodiment. In FIG. 14, the same processing steps as those in the first or second embodiment are denoted by the same reference numerals as those in FIGS. 3 and 10, and description of the same processing steps will be thus omitted.

Also, in the present embodiment, it will be assumed that redeye correction processing is carried out at the time of capturing images, and corrected images are saved on the recording medium. However, needless to say, redeye correction processing can be executed at any time rather than at the time of shooting.

Figure 15:
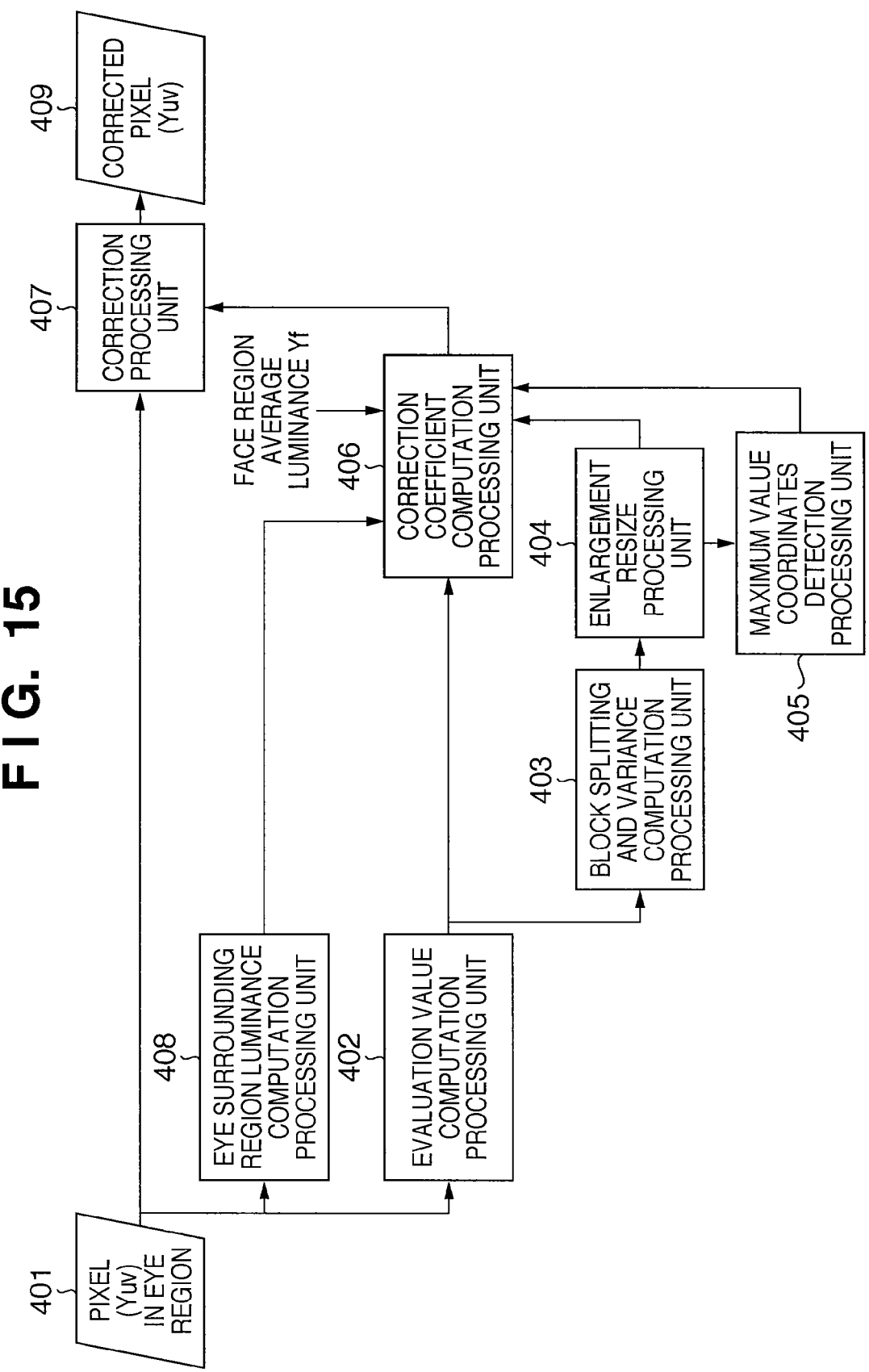
FIG. 15 is a diagram schematically illustrating internal processing constituting redeye correction processing and a flow of signals in the image capturing apparatus according to the third embodiment of the present invention.

Further, FIG. 15 is a diagram schematically illustrating internal processing constituting redeye correction processing and a flow of signals in the image capturing apparatus according to the present embodiment. The functions of each processing unit in FIG. 15 are implemented by the image processing unit 20, for example, as software. In addition, in FIG. 15, the same components as those in the first or second embodiment are denoted by the same reference numerals as those in FIGS. 4 and 12, and repeated description of the same components will be thus omitted.

The present invention is a combination of the first and second embodiments, and characterized in that both a face region average luminance Yf as a first luminance value and an eye surrounding region luminance Ye as a second luminance value are computed and that the correction coefficient computation processing unit 406 corrects a correction coefficient on the basis of these both luminance values.

Specifically, in the present embodiment, the correction coefficient computation processing unit 406 first computes a luminance correction coefficient α from the value of the eye surrounding region luminance Ye in the same as in the first embodiment.

Alternatively, a luminance correction coefficient β may be computed from the value of the face region average luminance Yf in the same as in the second embodiment.

Next, the correction coefficient computation processing unit 406 computes the absolute value ΔY of the difference between the eye surrounding region luminance Ye and the face region average luminance Yf with the use of the following formula.

$$\Delta Y = |Ye - Yf| \quad (13)$$

Further, the correction coefficient computation processing unit 406 computes a reliability coefficient γ in accordance with the ΔY. The reliability coefficient γ takes the maximum value of 1 as in the luminance correction coefficients α and β, and is set to increase with decrease in the luminance difference ΔY or to decrease with increase in the luminance difference ΔY.

In a normal state, the absolute value ΔY of the difference between the eye surrounding region luminance Ye and the face region average luminance Yf is small. Therefore, if the luminance difference ΔY is small, a correction coefficient is computed as described in the first and second embodiments. On the other hand, in a case in which the luminance difference ΔY is large, which indicates the possibility that the eye region has been falsely detected, false corrections are prevented in such a way that the correction coefficient is decreased with increase in the luminance difference ΔY.

Figure 16:
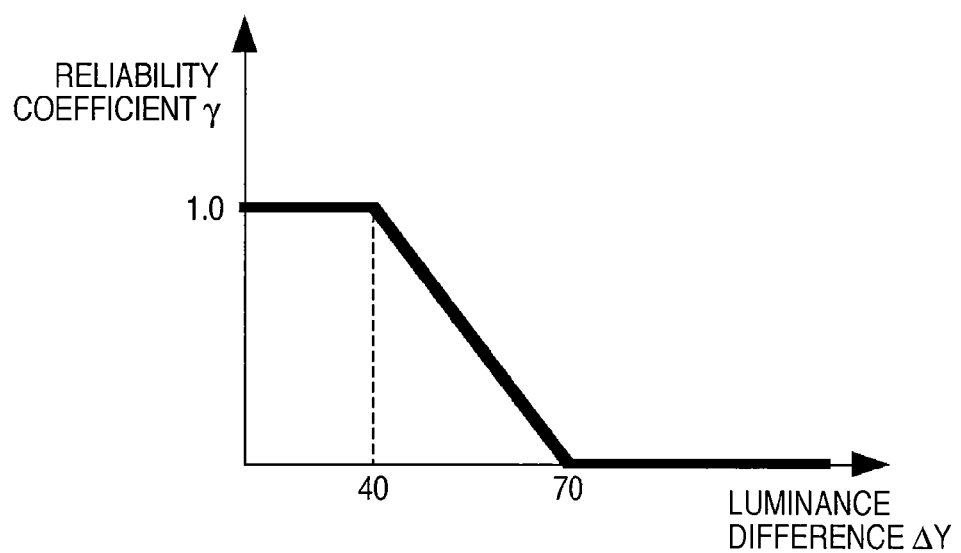
FIG. 16 is a diagram illustrating an example of the relationship between a reliability coefficient γ and a luminance difference ΔY in the third embodiment of the present invention.

FIG. 16 is a diagram illustrating an example of the relationship between a reliability coefficient γ and a luminance difference ΔY in the present embodiment. The correction coefficient computation processing unit 406 can, for example, store in advance a table which shows the relationship in FIG. 16, and compute the reliability coefficient γ corresponding to the value of the luminance difference ΔY.

Then, the correction coefficient computation processing unit 406 computes a correction coefficient C(x, y) with the use of the luminance correction coefficient α or β and the reliability coefficient γ as follows.

$$C(x,y) = E(x,y) \times D(x,y) \times W(x,y) \times \alpha \times \gamma \quad (14)$$

or $$C(x,y) = E(x,y) \times D(x,y) \times W(x,y)^{-\beta \times \gamma} \quad (15)$$

Since the subsequent correction processing is similar to that in the first embodiment, description of the subsequent processing will be omitted.

The configuration has been described in the present embodiment, where the reliability coefficient α with the relationship as shown in FIG. 16 is computed from the absolute value ΔY of the difference between the eye surrounding region luminance Ye and the face region average luminance Yf to correct the correction coefficient. However, for example, the present embodiment may be implemented on the assumption of γ=0 (no corrections made) if the absolute value ΔY of the difference is a predetermined value or more, or γ=1 (corrections made) if the absolute value ΔY of the difference is the predetermined value or less.

As described above, according to the present embodiment, in addition to the advantageous effects of the first or second embodiment, false corrections can be prevented with a high degree of accuracy because the correction coefficient is computed in view of the reliability of detection of the eye region by employing the difference between the value of the eye surrounding region luminance Ye and the face region average luminance Yf.

Other Embodiments

The embodiments described above can also be implemented as software by a system or an apparatus computer (or CPU, MPU or the like).

Therefore, a computer program supplied to a computer in order to implement the embodiments described above by such computer itself also implements the present invention. That is, a computer program for implementing the functions of the embodiments described above is itself within the scope of the present invention.

It should be noted that a computer program for implementing the embodiments described above may be in any form provided that it is computer-readable. Such a program may be executed in any form, such as an object code, a program executed by an interpreter, or script data supplied to an OS, but is not limited thereto.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network. The program data file may be in an executable format, or it may be in the form of source code.

Then, the program data file is supplied by downloading to a connected client computer accessing the server. In this case, the program data file may also be divided into a plurality of segment files and the segment files distributed among different servers.

In other words, a server device that provides program data files for implementing the functional processes of the present invention by computer to one or more client computers is also covered by the claims of the present invention.

It is also possible to encrypt and store the program of the present invention on a storage medium, distribute the storage medium to users, allow users who meet certain requirements to download decryption key data from a website via the Internet, and allow these users to decrypt the encrypted program by using the key data, whereby the program is installed in the user computer.

In addition, the computer program for implementing the embodiments described above may utilize the functions of an OS running on the computer.

Further, the computer program for achieving the embodiments described above may have part composed of firmware such as an expansion board integrated on a computer, or may be executed by a CPU provided on an expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-008167, filed on Jan. 17, 2008, which is hereby incorporated by reference herein its entirety.

What is claimed is:

1. An image processing apparatus comprising:
a face detection unit that detects a face region in an image;
an eye detection unit that detects an eye region in the image;
an evaluation value computation unit that computes an evaluation value for pixels included in the eye region, the evaluation value increased with increase in the redness of a pixel and with decrease in the luminance of a pixel;
a luminance computation unit that computes a luminance value for a surrounding region around the eye region in the image and a luminance value for the face region; and
a correction unit that corrects a color saturation value for pixels included in the eye region with the use of the evaluation value and the luminance values,
wherein the correction unit determines to correct the color saturation value for the pixels included in the eye region when an absolute value of the difference between the luminance value for the surrounding region and the luminance value for the face region is not more than a predetermined value, and determines not to correct the color saturation value for the pixels included in the eye region when the absolute value is more than the predetermined value.

2. The image processing apparatus according to claim 1, wherein the luminance computation unit computes, as the luminance value for the surrounding region, an average luminance value of pixels in the surrounding region.

3. The image processing apparatus according to claim 1, wherein the luminance computation unit computes, as the luminance value for the face region, an average luminance value of pixels in the face region.

4. The image processing apparatus according to claim 1, further comprising a measure computation unit that computes a measure indicative of a degree of variation in the evaluation values for each of multiple blocks constituting the eye region,
wherein the correction unit corrects the color saturation value for the pixels included in the eye region such that the amount of correction is smaller for pixels included in a block with the degree of variation smaller.

5. An image capturing apparatus comprising the image processing apparatus according to claim 1, wherein the image processing apparatus applies image processing to a captured image.

6. A non-transitory computer-readable storage medium with a program recorded thereon for making a computer function as each unit of the image processing apparatus according to claim 1.

7. An image processing method comprising:
a face detection step of detecting a face region in an image;
an eye detection step of detecting an eye region in the image;
an evaluation value computation step of computing an evaluation value for pixels included in the eye region, the evaluation value increased with increase in the redness of a pixel and with decrease in the luminance of a pixel;
a luminance computation step of computing a luminance value for a surrounding region around the eye region in the image and a luminance value for the face region; and
a correction step of determining whether to correct a color saturation value for pixels included in the eye region and correcting the color saturation value for pixels included in the eye region with the use of the evaluation value and the luminance values if it is determined to correct the color saturation value for pixels included in the eye region,
wherein the correction step determines to correct the color saturation value for the pixels included in the eye region when an absolute value of the difference between the luminance value for the surrounding region and the luminance value for the face region is not more than a predetermined value, and determines not to correct the color saturation value for the pixels included in the eye region when the absolute value is more than the predetermined value.

* * * * *